Oct. 20, 1931.    J. M. GWINN, JR    1,828,184
AIRCRAFT
Filed May 17, 1929
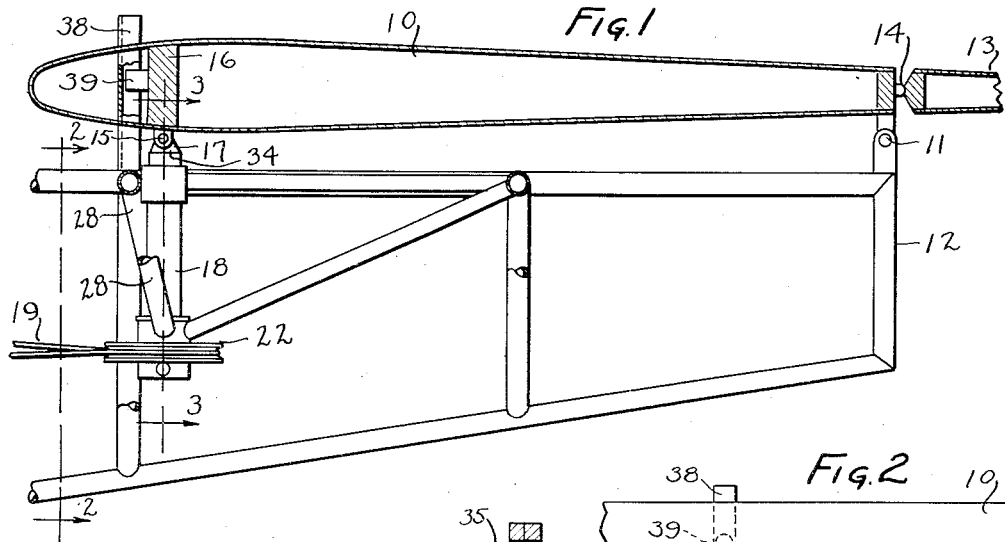
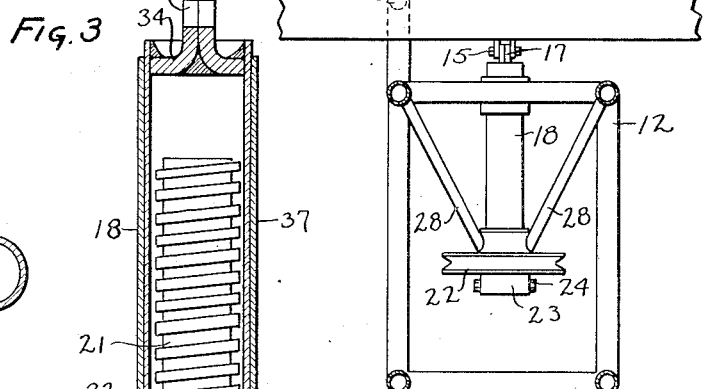
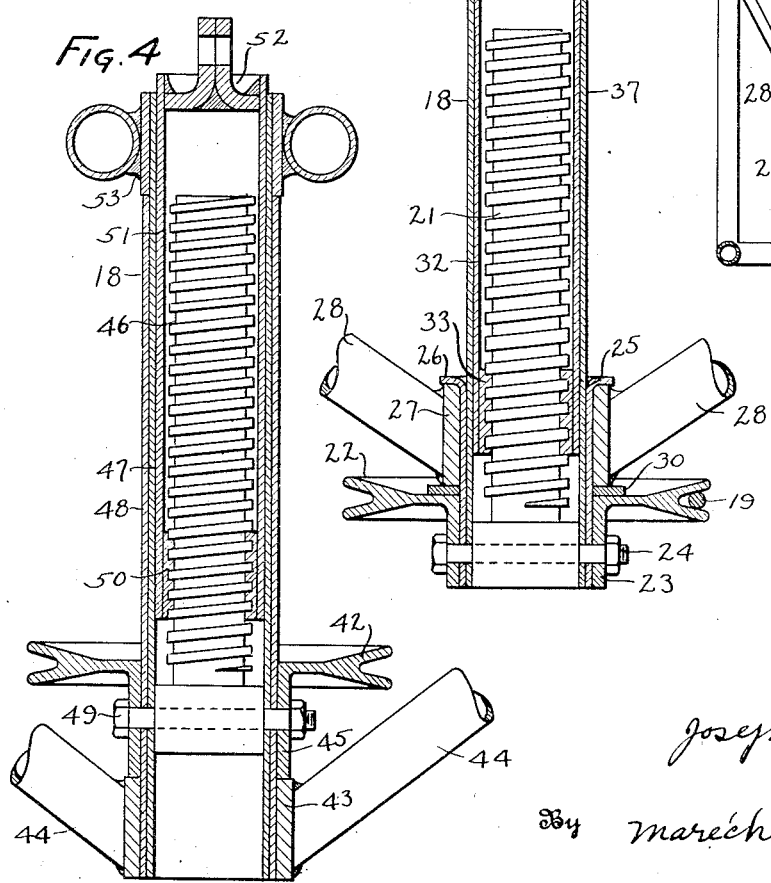
Inventor
Joseph M Gwinn Jr
By Maréchal and Noé
Attorneys Patented Oct. 20, 1931

1,828,184

UNITED STATES PATENT OFFICE

JOSEPH M. GWINN, JR., OF BUFFALO, NEW YORK

AIRCRAFT

Application filed May 17, 1929. Serial No. 363,843.

This invention relates to adjustment devices and is concerned primarily with adjustment devices adapted for aircraft use for positioning and holding an airfoil surface such as the horizontal stabilizing surface or the like, at the proper attitude.

One object of the invention is the provision of an adjustment device of this character which is cheap, compact and constructed of a comparatively few simple parts.

Another object of the invention is the provision of an adjustment device of this sort, constructed of a plurality of threaded members enclosed in a suitable tubular housing which protects, encloses and reinforces the threaded members.

Further objects and advantages of the invention will be apparent from the following description and from the accompanying drawings, in which—

Fig. 1 is a side elevation of the rear part of an aircraft embodying the present invention, shown partly in vertical section;

Fig. 2 is a vertical sectional view on the line 2—2 of Fig. 1;

Fig. 3 is a vertical section through the adjustment device on the line 3—3 of Fig. 1; and Fig. 4 is a view corresponding to Fig. 3 but showing a modified form of construction.

In the drawings the invention has been disclosed as an adjustment device for the control of the angle or attitude of a horizontal stabilizing surface of an airplane. It is apparent however that the invention is adapted for other uses. As shown, the horizontal stabilizing surface 10 is pivotally connected on a transverse axis 11 to the rear end of the fuselage 12. The horizontal rudder 13, which may be controlled in any suitable manner, is pivoted to the rear of the surface 10 on the axis 14. Near the front end of the horizontal stabilizing surface 10 the latter is attached by a suitable bolt 15 or the like, positioned preferably below the front wing beam 16, to a part 17, which is adapted to be moved vertically with relation to the fuselage so that the surface 10 is positioned at the proper angle of incidence. The part 17 is at the upper end of the adjustment device designated generally 18, and which is adapted to be remotely controlled by cables 19 or the like, from the aviator's station in the airplane.

The adjustment device 18 comprises a rotatable threaded member or screw 21 which is held against axial movement, and which is rotated by means of a suitable manually operated driving means. Preferably such driving means comprises the pulley wheel or the like 22 operated by the flexible cable 19, the pulley wheel 22 having a deep substantially V-shaped groove receiving the cable. Due to the shape of the groove the flexible cable may extend only half way around the pulley while providing a cheap and simple arrangement in which slipping of the cable does not occur, there being a squeezing action on the cable by the relatively inclined sides of the pulley groove. The cable is preferably spliced with a long splice of small diameter so as to extend endlessly over the pulley and the operating means therefor. On the pulley is a hub flange 23 which is attached to the lower end of the screw 21 by means of a transversely extending bolt 24. The bolt 24 which is adapted to be very readily removed for the disassembly of the apparatus, passes through the flange of the wheel 22 and through the lower end of the screw, and also passes through a collar 25 of tubular construction and fitting within the flange 23 as shown in Fig. 3. The upper end of the collar 25 is provided with a thrust end 26 flanged outwardly over the upper end of a fixed support or lower bearing 27. This lower bearing is preferably a short length of tubing supported at the lower ends of the fuselage brace tubes 28 which extend converging downwardly from suitable spaced parts of the fuselage framework. A thrust washer 30 is preferably provided between the upper side of wheel 22 and the lower side of the fixed bearing member 27.

The screw 21 is in threaded engagement with an enclosing axially movable sleeve preferably constructed as a metal tube 32 brazed or otherwise secured to a threaded screw portion 33 having internal threads engaging the threads on the screw 21. The upper end of this axially movable sleeve or tube 32 is welded or otherwise secured to an attachment 34 which closes the upper end of the tube and prevents its rotation, as the attachment 34 is pivotally secured to the lower side of the stabilizing surface 10 by means of the bolt 15 or the like which passes through the hole 35 in the attachment 34. Rotational movements of the screw 21 will cause the telescopic expansion or retraction of the sleeve and screw, and this will of course adjust the attitude of the horizontal stabilizer.

Enclosing the axially movable tube 32 is a housing tube 37, the inner cylindrical surface of which is in bearing engagement with the outer surface of tube 32. Tube 32 is therefore reinforced and rigidified by the housing as well as being protected from dirt and moisture. The housing tube may be rotatably guided at its upper end in a top bearing, but usually the single bearing 27 at the lower end will suffice as shown in Fig. 3. The lower end of the housing tube 37 is received within the collar 25 and is secured along with this collar and the screw 21 to the flange of the pulley wheel 22 by means of the single bolt 24. The housing tube 37 is therefore adapted to rotate with the screw and to thus reinforce the sleeve 32 during the axial movements of the latter. It also encloses and protects the latter so as to form a compact enclosed structure.

Where a fixed top bearing is provided to rotatably guide the upper end of tube 37, the bearing can take side loads on the stabilizer but when such bearing is omitted, as shown in the figure referred to, side loading on the stabilizer is preferably assumed independently of the adjustment device, as by means of a vertical channel 38 fixed to the fuselage framework and forming a vertical guide for a lug 39 fixed to the wing beam 16. This lug and channel guide arrangement provides for a rigid mounting and takes all side forces so that the adjustment device is substantially relieved from strains due to side loads, and its various parts need not be made with a high degree of accuracy and care.

It will now be apparent that a compact adjustment device is provided in accordance with this invention which is constructed of comparatively simple parts, the various tubes which make up the structure all being of cheap construction and easily manufactured. The parts are very readily assembled or disconnected, since the attachment bolt 24 secures several of the parts together, and when this bolt is removed, the housing sleeve 37, the collar 25, and the operating wheel 22 are all disconnected from one another and from the screw 21, which can then be rotated and disconnected from the sleeve 32 fastened to the stabilizing surface. The axially movable sleeve itself is also readily disconnected from the stabilizing surface 10, as the bolt 15 is very readily removed.

The collar 25 need not be constructed to engage the lower bearing member 27 to assume axial thrusts, and a modified form of construction is shown in Fig. 4 in which the pulley wheel 42 is positioned above the lower fixed bearing member 43 supported by the bracing and supporting tubes 44. The pulley wheel 42 has a flange 45 which abuts against the upper side of the fixed gearing member 43 thus preventing downward movements of the pulley wheel, and of the screw 46 and the two tubes 47 and 48 which are all connected together by the bolt 49. The screw 46, which is rotated by the pulley wheel 42, is in threaded engagement with an internally threaded screw portion 50 forming a part of an axially movable sleeve 51 the upper end of which is fixed to an attachment 52, this construction being generally the same as is shown in Fig. 3. The upper end of the tube 47 is shown rotatably held within the upper fixed support 53 formed as a short section of tubing welded or otherwise fixed to the fuselage frame, and this tube 47, which is rotatable on the outside of the axial sleeve 51, reinforces and strengthens and also encloses the latter during its operation.

The tube 48 encloses the tube 47 and rotates with it, these two tubes forming a housing for the axially movable sleeve and the screw. The upper end of the tube 48 abuts against the lower side of the fixed upper support 53, and therefore any upward movement of the housing sleeves or the screw is prevented. The various parts of the adjustment device which are secured together by the single bolt 49 are therefore all definitely positioned with relation to the upper and lower fixed guide supports at the upper and lower ends of the adjustment device.

It will be apparent that by reason of the reinforcement provided by the housing tube or tubes which enclose the threaded screw and sleeve, there is no binding tendency such as might occur when large loads on the upper end of the axially movable sleeve are assumed by the housing tube or tubes. Such large loads might otherwise put binding on the whole mechanism cramping the screw. Furthermore the housing tube or tubes help to make a tight structure.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An adjustment device for aircraft, of the class described, comprising a rotatable threaded member, operating means for said member, an axially movable member in threaded telescopic engagement with said rotatable member, means connecting said axially movable member to a device to be adjusted, a housing fixed to said rotatable threaded member, a collar rotatable with said housing, and a single bolt extending through said operating means, said collar, said housing and said rotatable threaded member.

2. An adjustment device for aircraft, of the class described, comprising a screw, a remotely controlled wheel for rotating said screw, a sleeve in threaded engagement with said screw, an attachment means at one end of said sleeve, a housing for said sleeve, means for rotatably guiding one end of said housing, a thrust tube enclosing a part of said housing, and means for securing said wheel to said screw, housing and thrust tube.

3. An adjustment device for aircraft, of the class described, comprising a screw, an axially movable sleeve in threaded engagement with said screw, a housing tube enclosing said axially movable sleeve and in bearing engagement therewith, means supporting one end portion of said housing tube, a thrust tube adapted to assume axial thrust, a drive wheel, and a bolt extending through said drive wheel, said thrust tube, said housing tube and said screw.

4. An adjustment device for aircraft, of the class described, comprising a screw, an axially movable sleeve in threaded engagement with said screw, a housing tube enclosing said axially movable sleeve and in bearing engagement therewith, a thrust tube adapted to assume axial thrust, support means therefor, a drive wheel, a bolt extending through said drive wheel, said thrust tube, said housing tube and said screw, and attachment means at the upper end of said sleeve adapted to be secured to an airplane stabilizing surface.

In testimony whereof I hereto affix my signature.

JOSEPH M. GWINN, Jr.